(12) United States Patent
Wynn et al.

(10) Patent No.: US 7,409,454 B2
(45) Date of Patent: Aug. 5, 2008

(54) AUTOMATIC DETECTION OF INTERMEDIATE NETWORK DEVICE CAPABILITIES

(75) Inventors: Tong L. Wynn, Redmond, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 10/452,173

(22) Filed: Jun. 2, 2003

(65) Prior Publication Data

US 2004/0243714 A1    Dec. 2, 2004

(51) Int. Cl.
G06F 15/16 (2006.01)
G06F 16/16 (2006.01)

(52) U.S. Cl. .................. 709/228; 709/222; 709/224; 709/231

(58) Field of Classification Search ............... 709/203, 709/224, 244; 370/401
See application file for complete search history.

(56) References Cited

U.S. PATENT DOCUMENTS

| | | | |
|---|---|---|---|
| 5,999,979 A | 12/1999 | Vallanki et al. | |
| 6,014,706 A | 1/2000 | Cannon et al. | |
| 6,052,710 A | 4/2000 | Saliba et al. | |
| 6,128,653 A | 10/2000 | del Val et al. | |
| 6,338,096 B1 | 1/2002 | Ukelson | |
| 6,662,231 B1 | 12/2003 | Drosset et al. | |
| 6,792,449 B2 * | 9/2004 | Colville et al. | 709/215 |
| 7,043,560 B2 * | 5/2006 | Coulombe et al. | 709/232 |
| 2003/0054794 A1 | 3/2003 | Zhang | |
| 2003/0225889 A1 * | 12/2003 | Moutafov | 709/227 |
| 2003/0236907 A1 * | 12/2003 | Stewart et al. | 709/231 |
| 2005/0111467 A1 * | 5/2005 | Ng et al. | 370/401 |
| 2006/0242275 A1 * | 10/2006 | Shapiro | 709/220 |

OTHER PUBLICATIONS

R. Fielding et al., HTTP/1.1 Protocol—RFC 2616, IETF, Jun. 1999.*
Mogul, Jeffrey, The Case for Persistent-Connection HTTP, SIGCOMM 1995.*
John Heidemann, 'Performance interactions between P-HTTP and TCP implementations', SIGCOMM, Apr. 1997.*
Liang, et al.; "A Bandwidth Effective Streaming of JPEG2000 Images using HyperText Transfer Protocol"; Proceedings 2002 IEEE International Conference on Mutlimedia and Expo; Cat. No. 02TH8604; vol. 1; pp. 525-528; Aug. 2002.

(Continued)

Primary Examiner—William C. Vaughn, Jr.
Assistant Examiner—Greg Bengzon
(74) Attorney, Agent, or Firm—Lee & Hayes, PLLC

(57) ABSTRACT

Automatic detection of intermediate network device capabilities includes analyzing requests received, at a particular device, from a remote device. The analyzing is performed to determine, based on the content of the requests, whether an intermediate device on the network situated between the device and the remote device does not support streaming of data from the device to the remote device using the pipelining feature of Hypertext Transport Protocol (HTTP) 1.1. In one implementation, a test is performed by sending two back to back requests from the remote device to the particular device. The test is determined to be a success if the requests are received within a threshold amount of time of one another, and a failure if the requests are not received within the threshold amount of time of one another.

50 Claims, 8 Drawing Sheets

OTHER PUBLICATIONS

Willebeek-Lemair, et al; "Bamba—Audio and video streaming over the internet"; IBM Journal of Research and Development; Mar. 1998; vol. 42, No. 2; pp. 269-280.

Kobayashi, et al.; "Asymmertric TCP Splicing for Content-Based Switches"; 2002 IEEE International Conference on Communications; Conference Proceedings, ICC 2002; Cat. No. 02CH37333; vol. 2; pp. 1321-1326; Apr.-May, 2002.

Deshpande, et al; "HTTP Streaming of JPEG2000 Images"; Proceedings International Conference on Information Technology; Coding and Computing; Apr. 2001; pp. 15-19.

Meeks, et al.; "Transducers and Associates: Circumventing Limitations of the World Wide Web"; Proceedings, The First Annual Conference on Emerging Technologies and Applications in Communications; May 1996; pp. 106-109; Cat. No. 97TB100035.

Real Time Streaming Protocol (RTSP); Network Working Group Request for Comments: 2326; Apr. 1998; pp. 1-92.

"Hypertext Transfer Protocol—HTTP/1.1"; Network Working Group Request for Comments: 2616; Jun. 1999; pp. 1-176.

* cited by examiner

AUTOMATIC DETECTION OF INTERMEDIATE NETWORK DEVICE CAPABILITIES

TECHNICAL FIELD

This invention relates to streaming media and data transfers, and particularly to automatic detection of intermediate network device capabilities.

BACKGROUND

Content streaming, such as the streaming of audio, video, and/or text is becoming increasingly popular. The term "streaming" is typically used to indicate that the data representing the media is provided over a network to a client computer on an as-needed basis rather than being pre-delivered in its entirety before playback of the data begins. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

A co-pending U.S. patent application Ser. No. 10/179,828, entitled "Communicating via a Connection Between a Streaming Server and a Client without Breaking the Connection", describes streaming data from a server to a client via an established connection, where commands can be communicated to the server and streaming can continue without breaking the connection. This streaming can occur, for example, using an HTTP 1.1 (HyperText Transfer Protocol version 1.1) connection. However, problems can arise when attempting to stream content over an HTTP 1.1 connection because even though the client and the server may support such streaming, a network device situated between the client and the server may not. This situation can create problems because commands may not be passed between the client and server as expected by the client and server.

The automatic detection of intermediate network device capabilities described herein solves these and other problems.

SUMMARY

Automatic detection of intermediate network device capabilities is described herein.

According to one aspect, a connection between two devices is tested to determine whether an intermediate device is present in the connection that does not support streaming data from one of the devices to the other using the pipelining feature of Hypertext Transport Protocol (HTTP) 1.1.

According to another aspect, a first request is received, at a device, from a remote device. A determination is made that the first request includes an indicator that the first request is one of a plurality of requests that are a test of streaming data from the device to the remote device using pipelined streaming. In response to this determination, a check is made as to whether a second request from the remote device is received at the device within a threshold amount of time of receiving the first request. The test is determined to be a success if the second request is received within the threshold amount of time, and a failure if the second request is not received within the threshold amount of time.

BRIEF DESCRIPTION OF THE DRAWINGS

The same numbers are used throughout the document to reference like components and/or features.

DETAILED DESCRIPTION

Figure 1:
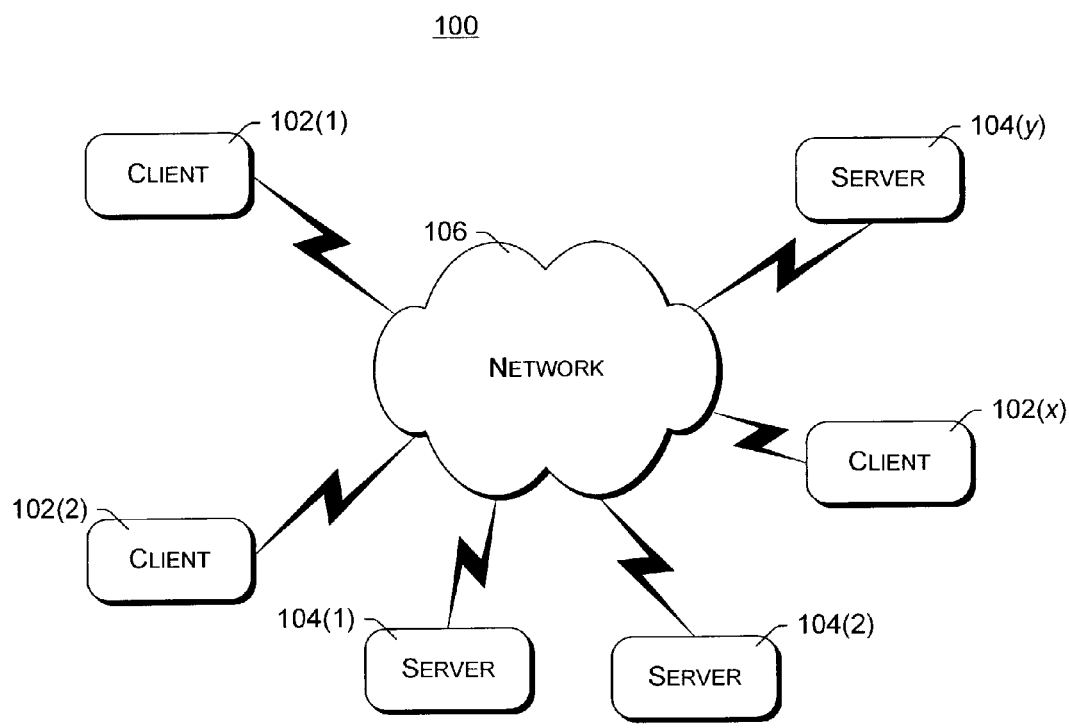
FIG. 1 illustrates an exemplary network environment.

FIG. 1 illustrates an exemplary network environment 100. In environment 100, multiple (x) client computing devices 102(1), 102(2), ..., 102(x) are coupled to multiple (y) server computing devices 104(1), 104(2), ..., 104(y) via a network 106. Network 106 is intended to represent any of a variety of conventional network topologies and types (including wire and/or wireless networks), employing any of a variety of conventional network protocols (including public and/or proprietary protocols). Network 106 may include, for example, the Internet as well as possibly at least portions of one or more local area networks (LANs).

Computing devices 102 and 104 can each be any of a variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

The discussions herein refer to client devices and server devices. It is to be appreciated that a server device can be any device that is the source of content, and a client device can be any device that receives the content (e.g., for presentation to a user at the client device). For example, in a peer to peer network, the device that is the source of the content can be referred to as the server device while the device that receives the content can be referred to as the client device.

Figure 2:
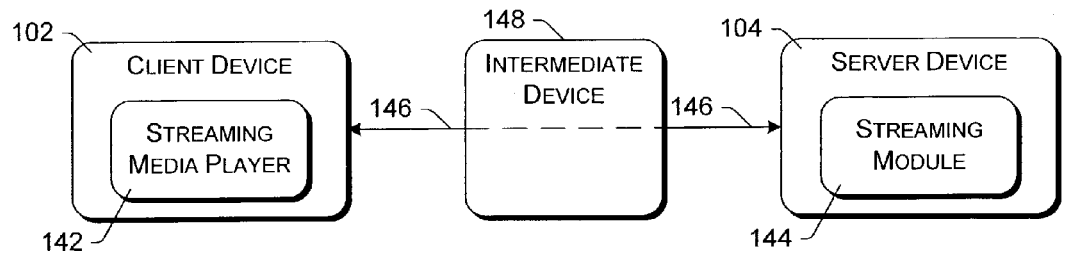
FIG. 2 illustrates exemplary client and server devices.

FIG. 2 illustrates exemplary client and server devices. Client device 102 includes a streaming media player 142 configured to access a streaming module 144 of server device 104. A HyperText Transport Protocol (HTTP) version 1.1 (HTTP 1.1) connection 146 is established between devices 102 and 104, allowing data and control information to be passed between streaming media player 142 and streaming module 144. Once established, connection 146 (also referred to as a "socket") remains open, allowing commands to continue to be sent from client device 102 to server device 104 (rather than to some other server device). By leaving the connection 146 open, commands to navigate through the media being streamed can be communicated from client device 102 to server device 104.

One or more intermediate devices (e.g., firewalls, routers, gateways, bridges, proxy servers, etc.) may be situated between client device 102 and server device 104. An example intermediate device 148 is illustrated in FIG. 2. The connection 146 between client device 102 and server device 104 passes through intermediate device 148. Depending on how such intermediate devices are designed and implemented, it is possible that one or more of the intermediate devices could interfere with streaming data over connection 146. As discussed in more detail below, the presence of such an intermediate device that would interfere with streaming data over connection 146 is automatically detected using the techniques described herein.

Although connection 146 is described as being an HTTP 1.1 connection, alternatively the connection may be of other types (e.g., subsequent versions of HTTP). Additionally, although the discussion herein describe detecting whether HTTP 1.1 pipelined streaming is supported (as discussed in more detail below), whether pipelined streaming using other protocols (e.g., versions of HTTP subsequent to HTTP 1.1) is supported may alternatively be detected.

Streaming media content can be stored and streamed to client device 102 in accordance with any of a variety of different streaming media formats. In one exemplary implementation, media is streamed in accordance with the ASF format (Advanced Streaming Format or Advanced Systems Format), including both current and proposed versions of the ASF specification. Additional information on ASF is available from Microsoft Corporation of Redmond, Wash.

Figure 3:
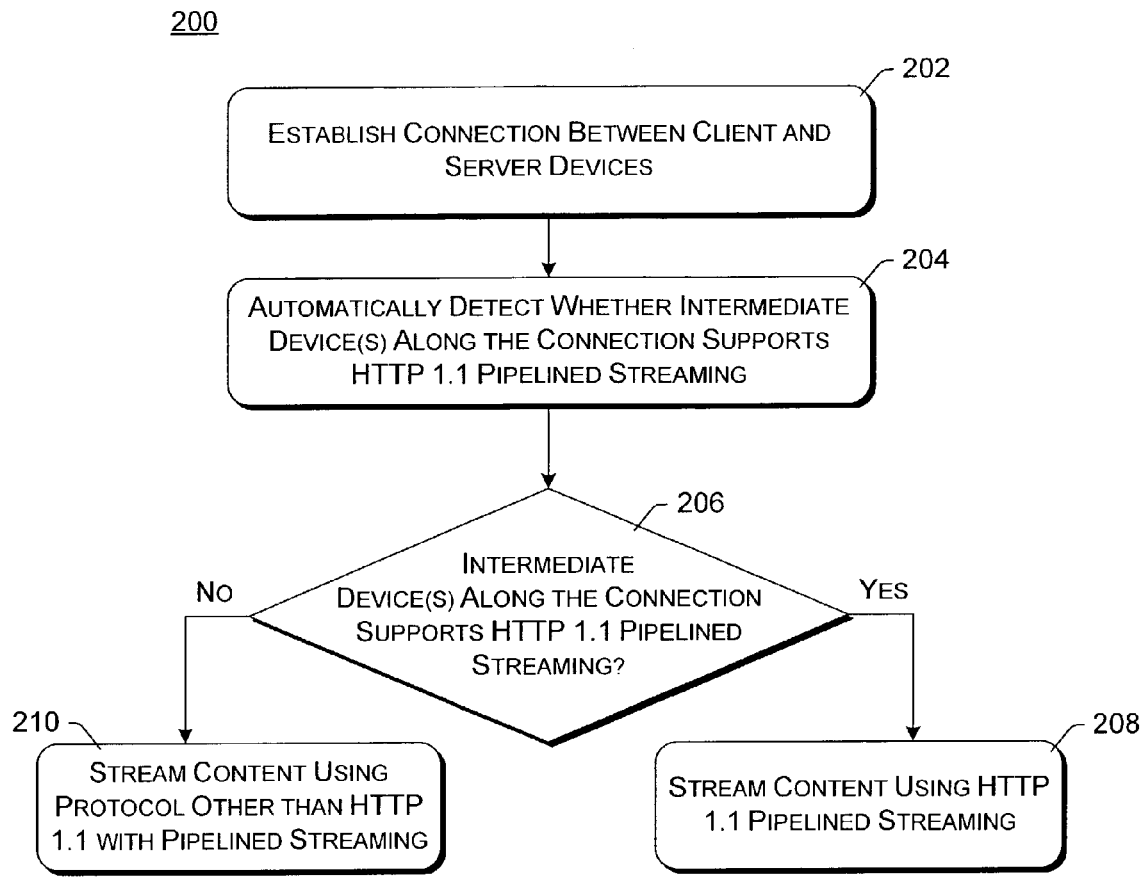
FIG. 3 is a flowchart illustrating an exemplary process for streaming media from a server device to a client device.

FIG. 3 is a flowchart illustrating an exemplary process 200 for streaming media from a server device to a client device. Process 200 is implemented by a combination of the server device and the client device, and may be performed in software, firmware, hardware, or combinations thereof.

Initially, an HTTP connection between the client and server devices is established (act 202). An automatic determination is then made as to whether device(s), if any, along the connection support HTTP 1.1 pipelined streaming (act 204). HTTP 1.1 pipelined streaming refers to streaming data using HTTP 1.1 pipelining. HTTP 1.1 pipelining is a feature of HTTP 1.1 that allows a client to make multiple requests without waiting for each response. HTTP 1.0, in contrast, generally prohibits sending a request until the response to any previously sent request(s) is received. Using this HTTP 1.1 pipelining feature when streaming data allows data to be streamed from the server to the client and allows communications to be sent from the client to the server (e.g., for commands to navigate the stream) without breaking the connection between the server and the client. One way in which content can be streamed from the server device to the client device using HTTP 1.1 pipelined streaming is described in co-pending U.S. patent application Ser. No. 10/179,828, entitled "Communicating via a Connection Between a Streaming Server and a Client without Breaking the Connection", which is hereby incorporated by reference.

Process 200 then proceeds based on whether the intermediate device(s), if any, along the connection support HTTP 1.1 pipelined streaming (act 206). If all of the intermediate devices support HTTP 1.1 pipelined streaming, then content is streamed from the server device to the client device using HTTP 1.1 pipelined streaming (act 208). However, if at least one intermediate device between the client and server devices does not support HTTP 1.1 pipelined streaming, then content is streamed without using HTTP 1.1 pipelined streaming (act 210). For example, HTTP 1.0 may be used, some other non-HTTP protocol may be used, or HTTP 1.1 may be used but without using the pipelining feature of HTTP 1.1.

An intermediate device is referred to as supporting HTTP 1.1 pipelined streaming if it does not operate to interfere with HTTP 1.1 pipelined streaming. For example, an intermediate device that operates according to HTTP 1.0, but not according to HTTP 1.1, would not support pipelining and could operate to interfere with the HTTP 1.1 pipelined streaming, and thus is referred to as not supporting HTTP 1.1 pipelined streaming. By way of another example, an intermediate device may claim to comply with HTTP 1.1 and support all features of HTTP 1.1, but in reality may not support pipelining. Such an intermediate device could operate to interfere with HTTP 1.1 pipelined streaming, and thus is referred to as not supporting HTTP 1.1 pipelined streaming.

Returning to FIG. 2, various techniques are described herein that can be employed to automatically detect the presence of an intermediate device that could interfere with HTTP 1.1 pipelined streaming of data over connection 146. Generally, these techniques include conducting an experiment or test using back to back requests to determine whether pipelining works, and performing a protocol identifier check. These techniques, as well as various implementations of these techniques, can be used individually or in any combination.

The technique of conducting an experiment using back to back requests to determine whether pipelining works involves the client device sending two HTTP requests one right after the other (e.g., with a very small time delay between the requests). The server device can determine, based on whether it receives both requests within a threshold amount of time, whether pipelining is supported by all intermediate device(s) (assuming there are one or more intermediate devices).

The technique of a protocol identifier check involves checking various indicators in HTTP request and HTTP response messages sent between the client and server devices. Different headers or alternatively other flags in these messages can be used by the client device and/or server device to detect if an intermediate device does not support HTTP 1.1 streaming.

Figure 4:
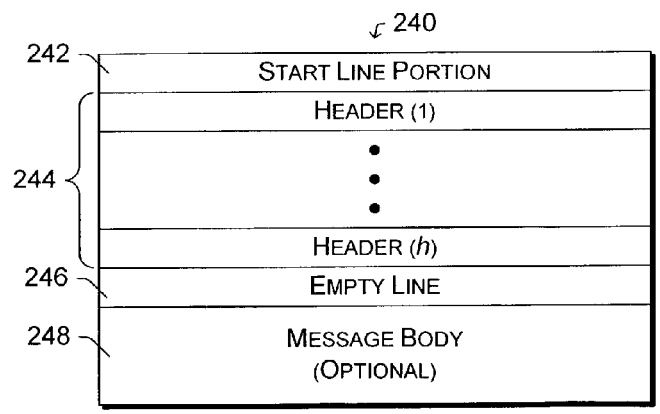
FIG. 4 illustrates an exemplary HTTP message format.

FIG. 4 illustrates an exemplary HTTP message format. The data structure 240 of an HTTP message includes a start line field or portion 242, one or more header fields or portions 244, an empty line field or portion 246, and an optional message body field or portion 248. Start line portion 242 contains data identifying the message or data structure type, which can be either a request-line (e.g., for an HTTP 1.1 GET request) or a status-line (e.g., for an HTTP 1.1 200 OK response). One or more headers 244 are also included that contain data representing information about the message. An empty line portion 246 is used to identify the end of the headers 244. Additional data may optionally be included in message body portion 248.

Figure 5:
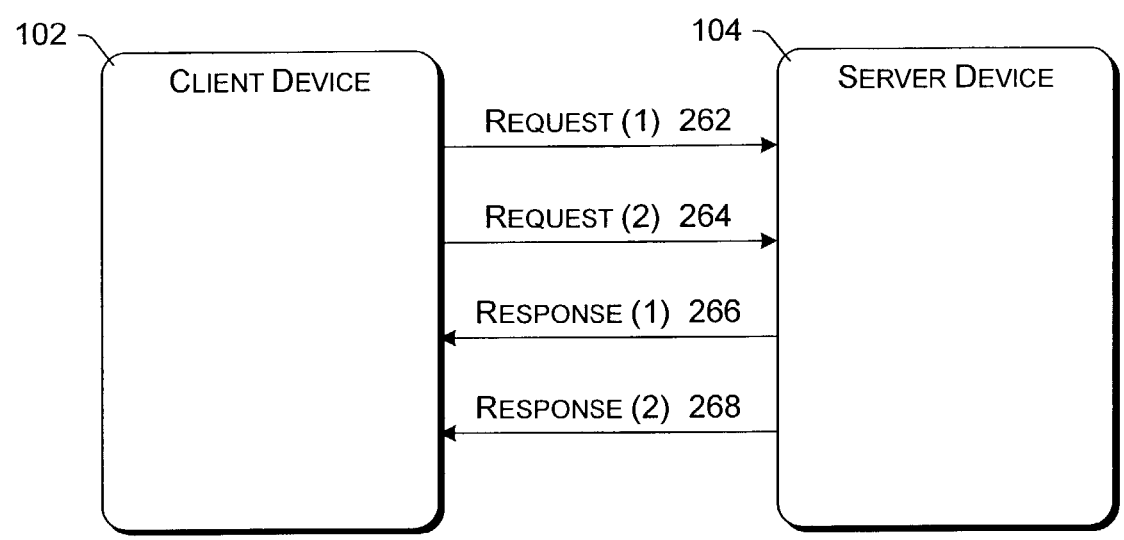
FIG. 5 is a data flow diagram illustrating an exemplary test or experiment using back to back requests to determine whether pipelining works.

FIG. 5 is a data flow diagram illustrating an exemplary test or experiment using back to back requests to determine whether pipelining works. To perform the test, client device 102 sends two back to back HTTP 1.1 GET requests 262 and 264 to server device 104. Sending the requests 262, 264 back to back refers to sending the requests with a short time interval between the requests. This time interval can vary in different implementations, and in certain implementations this time interval is less than 500 milliseconds. Alternatively, larger time intervals can be used. However, the time interval should be less than the threshold amount of time that the server device waits for receipt of the second GET request, as discussed in more detail below. Of these two back to back requests, the request that is sent by client device 102 earlier in time is referred to as the first request, and the request that is sent by client device 102 later in time is referred to as the second request. Alternatively, rather the GET requests, one or both of requests 262 and 264 may be other types of requests, such as an HTTP 1.1 POST request.

At least one of the two GET requests 262, 264 includes an experiment flag that indicates the requests 262, 264 are the two back to back GET requests of the experiment (and thus that the requests are testing the pipelined streaming of data from server device 104 to client device 102). Both requests 262, 264 may include the experiment flag, or alternatively only one request 262, 264 may include the experiment flag. Typically, at least the first request 262 includes the experiment flag, or at least the request 262, 264 that is received first by server device 104 includes the experiment flag.

In one implementation, the experiment flag is a pipeline-request header in a message to server device 104. For example, the pipeline-request header can be an HTTP 1.1 Pragma header (a Pragma header in HTTP 1.1 is a general-header field used to include implementation specific directives) that takes the following form:

Pragma:pipeline-request=1

The pipeline-request header is a header 244 of FIG. 4. It is to be appreciated that the pipeline-request header may be implemented in different manners (e.g., using a directive other than "pipeline-request=1", using a header other than a Pragma header, etc.). Alternatively, the experiment flag may be embedded in the body of a message (optional body 248 of FIG. 4) rather than a header.

When server device 104 receives the first request 262, server device 104 detects the presence of the experiment flag and knows that, as part of the test, server device 104 should receive the second request 264 within a short amount of time. If server device 104 receives the second request 264 within a threshold amount of time of receiving the first request, then the test is a success. However, if server device 104 does not receive the second request 264 within the threshold amount of time of receiving the first request, then server device 104 assumes that some intermediate device is interfering with the second request 264 and the test fails.

The threshold amount of time used by server device 104 can vary, and in one implementation is in the range of one to five seconds. In alternative implementations, other threshold amounts can be used. However, the threshold amount of time should be at least as long as the time delay between the sending of the two back to back requests by client device 102.

In response to receiving the first request 262, server device 104 sends a response 266 to client device. In one implementation, response 266 includes an HTTP 1.1 200 OK response message. Server device 104 begins responding to the first request 262, but does not finish responding to the first request 262 until the second request 264 is received (or until after the threshold amount of time passes without the second request being received). This beginning responding but not finishing responding can be performed in a variety of different manners. In one implementation, response 266 includes an initial HTTP 1.1 200 OK response message with a chunked encoding indication. The chunked encoding indication is used by server device 104 to indicate to client device 102 that the data transfer does not have a predefined length and that the data will be sent in pieces (chunks) with the end of the data being identified when server device 104 sends a zero-length chunk. In one implementation, chunked encoding is indicated by an HTTP 1.1 header "Transfer-encoding=chunked". The use of chunked encoding allows data to be transferred via HTTP 1.1 without identifying at the beginning of the transfer how much data will be transferred.

In another implementation, response 266 includes an initial HTTP 1.1 200 OK response message with an indication of the length of the data that will be sent to client device 102 (e.g., 1024 bytes). However, server device 104 delays in sending all of the bytes to client device 102 (and thus delays finishing the response). In this implementation, the response is not using chunked encoding.

Alternatively, rather than beginning but not finishing the data transfer from server device 104 to client device 102, server device 104 may not begin sending response 266 until the second request 264 is received (or until after the threshold amount of time passes without the second request being received).

Upon receiving the second request 264, server device 104 also responds to the second request 264 with a response 268. At least one of the responses 266 and 268 includes an experiment result flag that indicates whether the experiment is a success or a failure. Both responses 266, 268 may include the experiment result flag, or alternatively only one of the responses 266, 268 may include the experiment result flag. Typically, at least the second response 268 includes the experiment result flag. In one implementation, this experiment result flag is a pipeline-result header in a message to client device 102. For example, the pipeline-result header can be an HTTP 1.1 Pragma header that takes the following form to indicate success:

Pragma:pipeline-result=1 and the following form to indicate failure:

Pragma:pipeline-result=0

The pipeline-result header is a header 244 of FIG. 4. It is to be appreciated that the pipeline-result header may be implemented in different manners (e.g., using a directive other than "pipeline-result=1" or "pipeline-result=0", using a header other than a Pragma header, etc.). Alternatively, the experiment result flag may be embedded in the body of a message (optional body 248 of FIG. 4) rather than a header.

It should be noted that, with respect to FIG. 5, although requests 262, 264 and responses 266, 268 are shown in a particular order in FIG. 5, alternatively they may occur in different orders. For example, response 266 may be sent by server device 104 before request 264 is received by server device 104, or request 264 may be received by server device 104 before request 262 is received.

Figure 6:
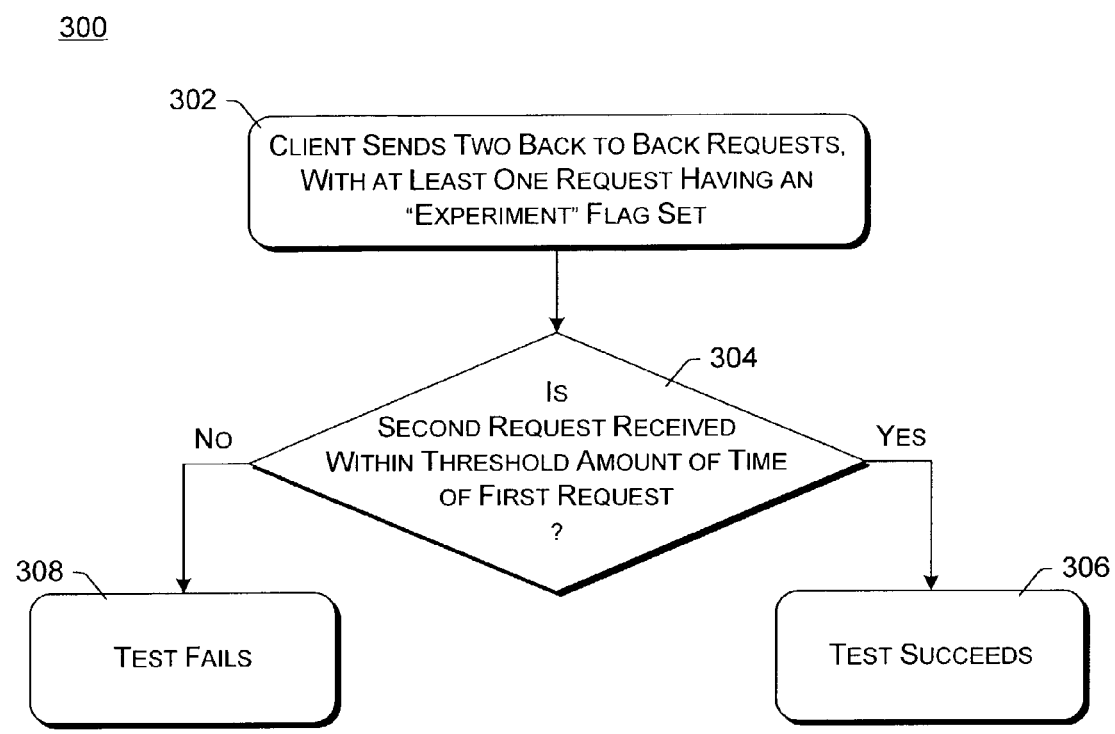
FIG. 6 is a flowchart illustrating an exemplary process for determining whether an intermediate device between a server device and a client device interferes with HTTP 1.1 pipelined streaming.

FIG. 6 is a flowchart illustrating an exemplary process 300 for determining whether an intermediate device between a server device and a client device interferes with HTTP 1.1 pipelined streaming. Process 300 is implemented by a combination of the server device and the client device, and may be performed in software, firmware, hardware, or combinations thereof. In one exemplary implementation, process 300 illustrates act 204 of FIG. 3 in additional detail.

Initially, the client device sends two back to back requests with at least one request having an experiment flag set to indicate that the test is being performed (act 302). The server device then checks whether the second of the two back to back requests is received within a threshold amount of time of receiving the first request (act 304). If the second request is received within the threshold amount of time of receiving the first request, then the test succeeds (act 306). However, if the second request is not received within the threshold amount of time of receiving the first request, then the test fails (act 308).

Returning to FIG. 2, in addition to the experiment illustrated in FIG. 5, additional checks, such as protocol identifier checks, can be performed to determine whether an intermediate device between a server device and a client device interferes with HTTP 1.1 pipelined streaming. One such check is a check of the protocol number being used in an HTTP message. HTTP messages typically identify the protocol number (e.g., HTTP 1.0 or HTTP 1.1). If client device 102 sends a message using HTTP 1.1 to server device 104, and if intermediate device 148 does not support HTTP 1.1 then intermediate device 148 may change the message to be HTTP 1.0 rather than HTTP 1.1. If server device 104 receives a message with a protocol number of 1.0 rather than 1.1, then server device 104 knows that HTTP 1.1 pipelined streaming is not to be used.

Similarly, if server device 104 sends a message using HTTP 1.1 to client device 102, and if intermediate device 148 does not support HTTP 1.1 then intermediate device 148 may change the message to be HTTP 1.0 rather than HTTP 1.1. If client device 102 receives a message with a protocol number of 1.0 rather than 1.1, then client device 102 knows that HTTP 1.1 pipelined streaming is not to be used.

Another way that the protocol number can be checked is by checking whether any "Via" headers are included in a message (whether the message is received by client device 102 or server device 104). If intermediate device 148 does not support HTTP 1.1 then intermediate device 148 may include a Via header in a message that passes through it along connection 146 that indicates which protocol version intermediate device 148 supports. Thus, if a client device or server device receives a message with a Via header that indicates HTTP 1.0 (e.g., a header "Via: 1.0" as one of headers 244 of FIG. 4), then the receiving device knows that HTTP 1.1 pipelined streaming is not to be used.

Another check that can be performed to determine whether an intermediate device between a server device and a client device interferes with HTTP 1.1 pipelined streaming is to determine whether a "Connection:close" header is included in a message (whether the message is received by client device 102 or server device 104). Streaming over HTTP 1.1 using pipelining typically includes keeping the connection 146 open. If intermediate device 148 does not support HTTP 1.1 pipelining, then intermediate device 148 may include a "Connection:close" header in a message that passes through it along connection 146 that indicates the connection will be closed after the current request or response is finished. Thus, if a client device or server device receives a message with a "Connection:close" header, then the receiving device knows that HTTP 1.1 pipelined streaming is not to be used.

If any of the checks indicate that HTTP 1.1 pipelined streaming is not to be used, then client device 102 sends an indication to server device 104 to not use HTTP 1.1 pipelined streaming. A similar indication may also be sent from server device 104 to client device 102. In one implementation, this indication is a header indicating to inhibit HTTP 1.1 pipelined streaming. For example, the header can be an HTTP 1.1 Pragma header that takes the following form:

Pragma:version11-enabled=0

This Pragma header is a header 244 of FIG. 4. It is to be appreciated that the inhibit HTTP 1.1 pipelined streaming header may be implemented in different manners (e.g., using a directive other than "version11-enabled=0", using a header other than a Pragma header, etc.). Alternatively, the indication that HTTP 1.1 pipelined streaming is to be disabled may be embedded in the body of a message (optional body 248 of FIG. 4) rather than a header.

Additionally, according to certain embodiments, an experiment interest indication is sent from client device 102 to server device 104. The experiment interest indication is used by client device 102 to notify server device 104 that client device 102 desires to perform the experiment discussed above with two back to back requests. In one implementation, the experiment interest indication is an HTTP 1.1 Pragma header that takes the following form:

Pragma:pipeline-experiment=1

This Pragma header is a header 244 of FIG. 4. It is to be appreciated that this header may be implemented in different manners (e.g., using a directive other than "pipeline-experiment=1", using a header other than a Pragma header, etc.). Alternatively, the experiment interest indication may be embedded in the body of a message (optional body 248 of FIG. 4) rather than a header.

In certain embodiments, the Pragma:pipeline-experiment=1 header is included in a message sent from client device 102 to server device 104 requesting information describing the media to be streamed. In one implementation, this is an HTTP 1.1 GET request that obtains the ASF header file for the media to be streamed. Alternatively, the Pragma:pipeline-experiment=1 header may be sent separately from this request for information describing the media to be streamed.

If server device 104 understands the experiment interest indication then it will send a response to client device 102 indicating that it understands the experiment interest indication. In one implementation, this response includes the same header (e.g., Pragma:pipeline-experiment=1) as was used in the request sent by client device 102. If server device 104 does not understand the experiment interest indication, then the response by server device 104 typically will not include any indication that it understands the experiment interest indication. For example, no Pragma:pipeline-experiment=1 header would be included in the response.

When client device 102 receives the response from server device 104, client device 102 can determine whether to proceed with the experiment (the test using two back to back requests, such as discussed above with respect to FIG. 6) based on whether the response indicates that server device 104 understands the experiment interest indication. If server device 104 understands the experiment interest indication, then client device 102 proceeds with the experiment. However, if server device 104 does not understand the experiment interest indication, then client device 102 assumes that server device 104 would also not understand the experiment, so client device 102 does not proceed with the experiment and assumes that HTTP 1.1 pipelined streaming is not to be used.

The experiment interest indication can also be used for server device 104 to return, to client device 102, an indication that intermediate device 148 does not support HTTP 1.1 pipelined streaming. If, using one of the checks discussed above, server device 104 determines that intermediate device 148 does not support HTTP 1.1 pipelined streaming (e.g., by a change in the protocol number), then server device 104 includes an indication of such to client device 102. For example, server device 104 may send a response message to client device 102 including a Pragma:pipeline-experiment=0 header, informing client device 102 that server device 104 understands the Pragma:pipeline-experiment=1 header, but that intermediate device 148 does not support HTTP 1.1 pipelined streaming. Alternatively, rather than a Pragma header, any of the alternative indications discussed above with respect to the Pragma:pipeline-experiment=1 header could be used.

Figure 7A:
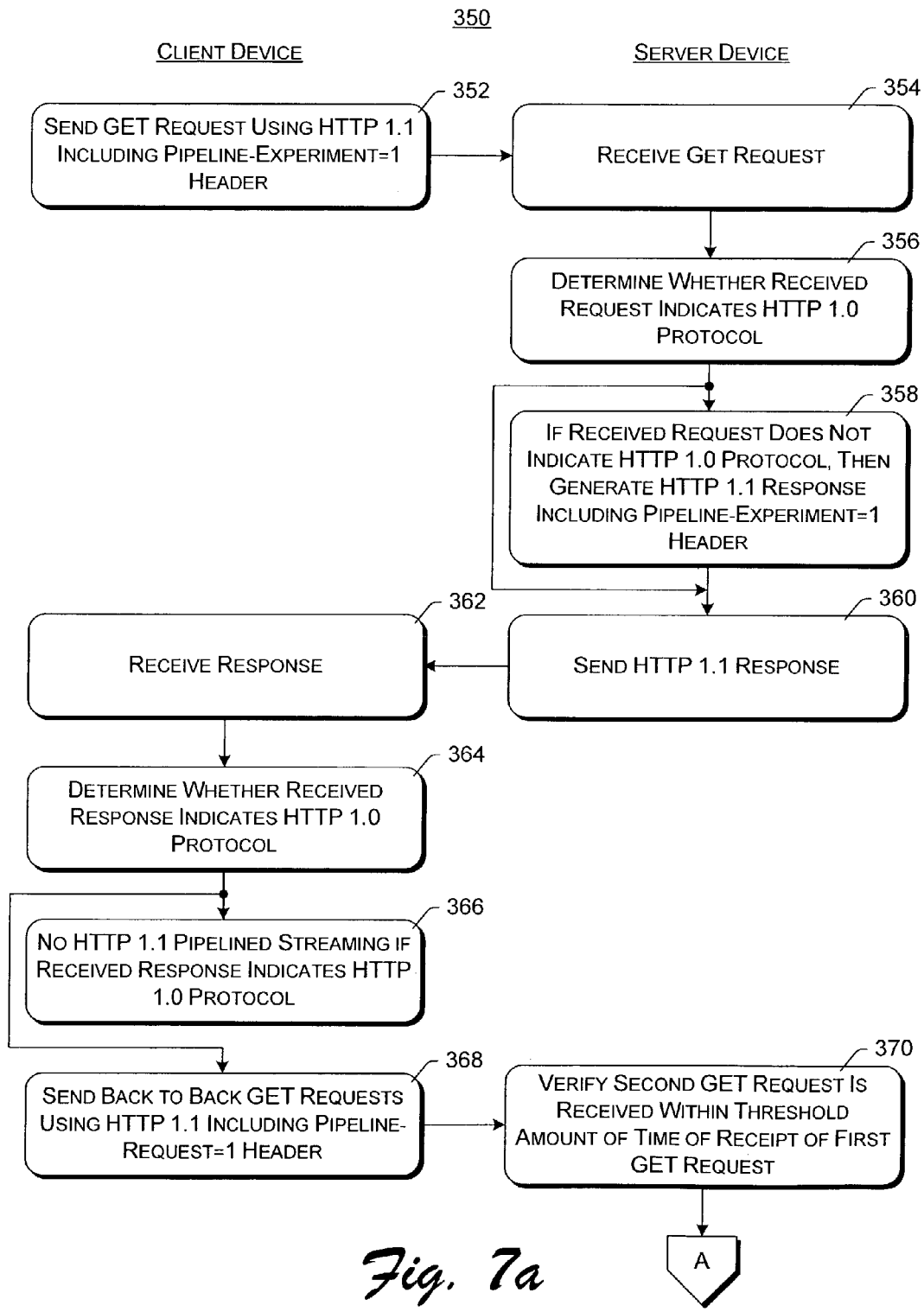
FIGS. 7a and 7b are a flowchart illustrating an exemplary process for determining whether an intermediate device between a server device and a client device interferes with HTTP 1.1 pipelined streaming.
Figure 7B:
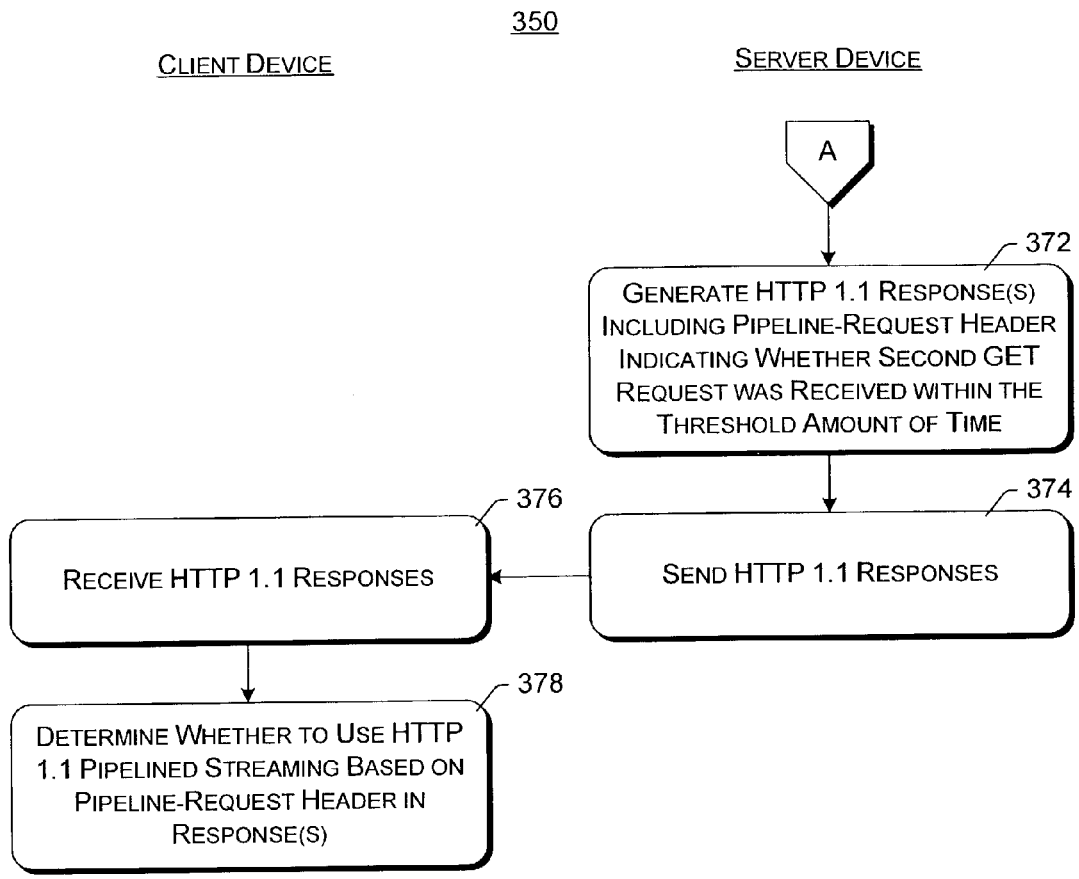

FIGS. 7a and 7b are a flowchart illustrating an exemplary process 350 for determining whether an intermediate device between a server device and a client device interferes with HTTP 1.1 pipelined streaming. Process 350 is implemented by a combination of the server device and the client device, and may be performed in software, firmware, hardware, or combinations thereof. Acts performed by the server device are illustrated on the right side of FIGS. 7a and 7b, while acts performed by the client device are illustrated on the left side of FIGS. 7a and 7b.

Initially, the client device sends an HTTP 1.1 GET request that includes a Pragma:pipeline-experiment=1 header (act 352 of FIG. 7a). The GET request is received by the server device (act 354), and the server device determines whether the received request indicates the HTTP 1.0 protocol (act 356). As discussed above, this determination can be made, for example, by determining what protocol number(s) are used in the GET request.

If the received GET request does not indicate the HTTP 1.0 protocol, then an HTTP 1.1 response is generated that includes a Pragma:pipeline-experiment=1 header (act 358). The HTTP 1.1 response is then sent to the client device (act 360). This response in act 360 includes the Pragma:pipeline-experiment=1 header only if the request received by server device in act 354 does not indicate the HTTP 1.0 protocol. If the request received by server device in act 354 were to indicate the HTTP 1.0 protocol, then the response in act 360 would include no Pragma:pipeline-experiment header, or a Pragma:pipeline-experiment=0 header.

The response is received at the client device (act 362), and the client device determines whether the received response indicates the HTTP 1.0 protocol (act 364). As discussed above, this determination can be made, for example, by determining what protocol number(s) are used in the response. If the received response indicates the HTTP 1.0 protocol, then HTTP 1.1 pipelined streaming is not to be used (act 366). However, if the received response does not indicate the HTTP 1.0 protocol, then the client device sends two back to back HTTP 1.1 GET requests, at least one of which includes a Pragma:pipeline-request=1 header (act 368).

The server device receives the GET requests and verifies that the second GET request is received within a threshold amount of time of receiving the first GET request (act 370). The server device then generates HTTP 1.1 responses to the back to back GET requests, and at least one of the responses includes a Pragma:pipeline-request header indicating whether the second GET request was received within the threshold amount of time (act 372 of FIG. 7b). For example, a Pragma:pipeline-result=1 header can be used to indicate that the second GET request was received within the threshold amount of time, and a Pragma:pipeline-result=0 header can be used to indicate that the second GET request was not received within the threshold amount of time.

The generated HTTP 1.1 responses are then sent to the client device (act 374). The client device receives the responses (act 376), and determines whether to use HTTP 1.1 pipelined streaming based on the pipeline-request header in the response(s) (act 378). If the second GET request was received by the server device within the threshold amount of time then HTTP 1.1 pipelined streaming can be used, whereas if the second GET request was not received by the server device within the threshold amount of time then HTTP 1.1 pipelined streaming cannot be used. The client device may also check protocol numbers indicated in the responses when making the determination in act 378 (e.g., to verify that no is protocol numbers indicate HTTP 1.0).

Thus, it can be seen that the capabilities of intermediate network devices to support HTTP 1.1 pipelined streaming can be automatically detected. This detection can be performed by the client device and/or the server device, and can be performed without directly querying the intermediate device(s) as to their capabilities. Thus, it can be seen that the techniques described herein allow the capabilities of intermediate network devices to be automatically detected in a passive manner. It should also be noted that this automatic detection can be performed without any knowledge of the identities of any of the intermediate devices, without any knowledge of what functions are being performed by the intermediate devices (except for whether they support HTTP 1.1 pipelined streaming), and without any knowledge of how many intermediate devices are present.

Figure 8:
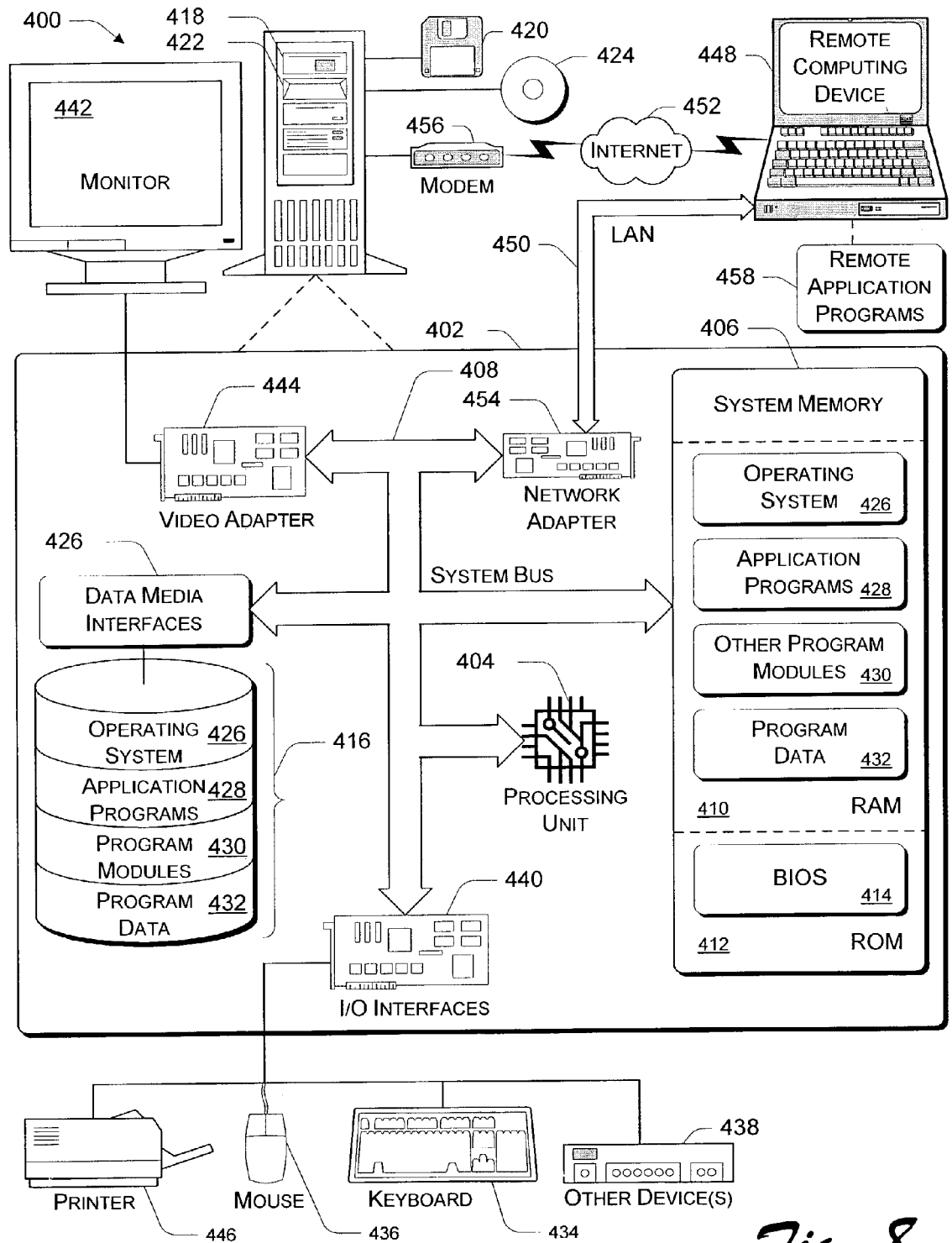
FIG. 8 illustrates a general computer environment which can be used to implement the techniques described herein.

FIG. 8 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client 102 or server 104 of FIGS. 1, 2, or 5. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 8 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media".

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer storage media having stored thereon a data structure which is communicated from a client device to a server device where the data structure is used to determine whether a connection between the client device and the server device supports HyperText Transfer Protocol 1.1 (HTTP 1.1) or later pipelined streaming, the data structure comprising:

a first portion containing data identifying a message type;

a second portion containing data identifying one or more headers, the one or more headers including an experiment interest header comprising Pragma:pipeline-experiment=1 to notify the server device that the client device desires to perform a test to determine whether HTTP 1.1 pipelined streaming is supported by an intermediate device which is part of the connection from the server device to the client device before HTTP 1.1 pipelined streaming of data is initiated, and to further notify the server device that the test comprises sending a first request and a second request as back-to-back requests over the connection from the client device to the server device, whereby the server device can determine whether HTTP 1.1 pipelined streaming is supported by the intermediate device which is part of the connection based on whether the server device receives the second request within a threshold duration of time of receiving the first request; and a third portion containing data identifying an end of the second portion in the data structure.

2. A computer storage media as recited in claim 1, wherein the data structure is a HyperText Transfer Protocol 1.1 message.

3. A computer storage media as recited in claim 1, wherein the test comprises a test of streaming data using pipelining from the server device to the client device.

4. A computer storage media having stored thereon a data structure which is communicated from a client device to a server device where the data structure is used to determine whether a connection between the client device and the server device supports HyperText Transfer Protocol 1.1 (HTTP 1.1) or later pipelined streaming, the data structure comprising:

a first portion containing data representing a type of the data structure; and a second portion containing data identifying a directive for the data structure that notifies the server device that the client device desires to perform a test to determine whether HTTP 1.1 pipelined streaming is supported by an intermediate device which is part of the connection between the server device and the client device before HTTP 1.1 pipelined streaming of data is initiated, and that further notifies the server device that the test comprises sending a first request and a second request as back-to-back requests over the connection from the client device to the server device, wherein the directive for the data structure comprises pipeline-experiment=1, whereby the server device can determine whether HTTP 1.1 pipelined streaming is supported by the intermediate device which is part of the connection based on whether the server device receives the second request within a threshold duration of time of receiving the first request, the second portion further functioning to delimit an end of the data structure.

5. A computer storage media as recited in claim 4, wherein the type of the data structure comprises a HyperText Transfer Protocol Pragma header.

6. A computer storage media as recited in claim 4, wherein the data structure is a header of a HyperText Transfer Protocol message.

7. A computer storage media having stored thereon a data structure which is communicated from a client device to a server device where the data structure is used to determine whether a connection between the client device and the server device supports HyperText Transfer Protocol 1.1 (HTTP 1.1) or later pipelined streaming, the data structure comprising:

a first portion containing data identifying a message type;

a second portion containing data identifying one or more headers, the one or more headers including an experiment flag header to notify the server device that the message is part of a test to determine whether HTTP 1.1 pipelined streaming is supported by an intermediate device which is part of the connection between the server device and the client device before HTTP 1.1 pipelined streaming of data initiated, wherein the experiment flag header comprises Pragma:pipeline-request=1, and to further notify the server device that the test comprises sending a first request and a second request as back-to-back requests over the connection from the client device to the server device, whereby the server device can determine whether HTTP 1.1 pipelined streaming is supported by the intermediate device which is part of the connection based on whether the server device receives the second request within a threshold duration of time of receiving the first request; and a third portion containing data identifying an end of the second portion in the data structure.

8. A computer storage media as recited in claim 7, wherein the data structure is a HyperText Transfer Protocol 1.1 message.

9. A computer storage media having stored thereon a data structure which is communicated from a client device to a server device where the data structure is used to determine whether a connection between the client device and the server device supports HyperText Transfer Protocol 1.1 (HTTP 1.1) or later pipelined streaming, the data structure comprising:

a first portion containing data representing a type of the data structure; and a second portion containing data identifying a directive for the data structure that notifies the server device that the data structure is part of a test, to determine whether HTTP 1.1 pipelined streaming is supported by an intermediate device which is part of the connection between the server device and the client device before HTTP 1.1pipelined streaming of data is initiated, wherein the directive for the data structure comprises pipeline-request=1, and that further notifies the server device that the test comprises sending a first request and a second request as back-to-back requests over the connection from the client device to the server device, whereby the server device can determine whether HTTP 1.1 pipelined streaming is supported by the intermediate device which is part of the connection based on whether the server device receives the second request within a threshold duration of time of receiving the first request, the second portion further functioning to delimit an end of the data structure.

10. A computer storage media as recited in claim 9, wherein the type of the data structure comprises a HyperText Transfer Protocol Pragma header.

11. A computer storage media as recited in claim 9, wherein the data structure is a header of a HyperText Transfer Protocol message.

12. A computer storage media as recited in claim 9, wherein the test comprises a test of pipelined streaming of data.

13. A computer storage media having stored thereon a data structure which is communicated from a client device to a server device where the data structure is used to direct the server device not to use pipelined streaming for communicating data over a connection to the client device, the data structure, comprising:
 a first portion containing data identifying a message type;
 a second portion containing data identifying one or more headers, the one or more headers including an inhibit version 1.1 header to indicate to a server device that data should not be streamed to a client device using HyperText Transfer Protocol 1.1 pipelined streaming, wherein the inhibit version 1.1 header comprises:

Pragma:version11-enabled=0; and a third portion containing data identifying an end of the second portion in the data structure.

14. A computer storage media as recited in claim 13, wherein the data structure is a HyperText Transfer Protocol 1.1 message.

15. A computer media having stored thereon a data structure, which is communicated from a client device to a server device where the data structure is used to direct the server device not to use pipelined streaming for communicating data over a connection to the client device, the data structure comprising:
 a first portion containing data representing a type of the data structure; and
 a second portion containing data identifying a directive for the data structure that notifies a server device that streaming of data to a client device should not use HyperText Transfer Protocol 1.1 pipelined streaming, the second portion further functioning to delimit an end of the data structure, wherein the directive for the data structure comprises version11-enabled=0.

16. A computer storage media as recited in claim 15, wherein the type of the data structure comprises a HyperText Transfer Protocol Pragma header.

17. A computer storage media as recited in claim 15, wherein the data structure is a header of a HyperText Transfer Protocol message.

18. A method, implemented in a device, the method comprising:
 receiving, at the device, a first request from a remote device;
 determining that the first request comprises an indicator that the first request is one of two requests that are part of a test to determine whether HyperText Transfer Protocol 1.1 (HTTP 1.1) or later pipelined streaming is supported by intermediate devices which are part of a connection between the device and the remote device before HTTP 1.1 pipelined streaming of data is initiated, wherein the test comprises sending the first request and a second request as back-to-back requests over the connection from the remote device to the device, whereby the device can determine whether HTTP 1.1 pipelined streaming is supported by intermediate devices which are part of the connection based on whether the device receives the second request within a threshold amount of time of receiving the first request, wherein the indicator of whether the test is a success or a failure comprises a pipeline-result=1 header if the test is a success, and a pipeline-result=0 header if the test is a failure;
 in response to the determining, checking whether the second request from the remote device is received at the device within the threshold amount of time of receiving the first request; and
 determining that the test is a success if the second request is received within the threshold amount of time, and determining that the test is a failure if the second request is not received within the threshold amount of time.

19. A method as recited in claim 18, wherein the first request is sent by the device prior to the second request being sent by the device.

20. A method as recited in claim 18, wherein the first request and second request are both HyperText Transfer Protocol (HTTP) GET requests.

21. A method as recited in claim 18, wherein receiving the first request comprises receiving the first request via a network.

22. A method as recited in claim 18, further comprising responding to the first request prior to receiving the second request.

23. A method as recited in claim 18, further comprising:
 generating a response to the second request that comprises an indication of whether the test is a success or a failure; and
 sending the response to the remote device.

24. A method as recited in claim 18, further comprising beginning a response to the first request but not finishing the response until the second request is received at the device or the threshold amount of time after receiving the first request elapses.

25. A method as recited in claim 24, wherein beginning the response comprises sending a message to the remote device indicating that the response to the first request will be sent using chunked encoding, and wherein finishing the response comprises sending a zero-length chunk.

26. A method as recited in claim 24, wherein beginning the response comprises sending a message to the remote device indicating that data to be sent as the response to the first request has a particular length, and wherein not finishing the response comprises not sending all of the data until the second request is received at the device or the threshold amount of time after receiving the first request elapses.

27. A method, as recited in claim 18 wherein the indicator comprises a pipeline-request=1 header.

28. A method as recited in claim 18, wherein the device comprises a streaming media server and wherein the remote device comprises a client computing device.

29. One or more computer storage media having stored thereon a plurality of instructions that, when executed by one or more processors, causes the one or more processors to:
 receive a first request from a remote device;
 identify, based on an indicator in the first request, that the first request is one of two requests that are a test to determine whether HyperText Transfer Protocol 1.1 (HTTP 1.1) or later pipelined streaming of data is supported by intermediate devices which are part of a connection with the remote device before communicating data to the remote device using HTTP 1.1 pipelined streaming, wherein the test comprises sending the first request and a second request as back-to-back requests over the connection from the remote device;
 in response to the identification, check whether the second request from the remote device is received within a threshold amount of time of receipt of the first request;
 determine that the test is a success if the second request is received within the threshold amount of time, and determine that the test is a failure if the second request is not received within the threshold amount of time;

generate a response to the second request that comprises an indication of whether the test is a success or a failure; and send the response to the second request to the remote device, wherein the indication of whether the test is a success or a failure comprises a pipeline-result=1 header if the test is a success, and a pipeline-result=0 header if the test is a failure.

30. One or more computer storage media as recited in claim 29, wherein the first request is sent by the device prior to the second request being sent by the device.

31. One or more computer storage media as recited in claim 29, wherein the first request and second request are both HyperText Transfer Protocol (HTTP) GET requests.

32. One or more computer storage media as recited in claim 29, wherein the first request is received via a network.

33. One or more computer storage media as recited in claim 29, wherein the instructions further cause the one or more processors to respond to the first request prior to receipt of the second request.

34. One or more computer storage media as recited in claim 29, wherein the instructions further cause the one or more processors to begin a response to the first request but not finish the response until the second request is received or the threshold amount of time after receipt of the first request elapses.

35. One or more computer storage media as recited in claim 34, wherein to begin the response by sending a message to the remote device indicating that the response to the first request will be sent using chunked encoding, and wherein to finish the response comprises sending a zero-length chunk.

36. One or more computer storage media as recited in claim 34, wherein to begin the response comprises sending a message to the remote device indicating that data to be sent as the response to the first request has a particular length, and wherein to not finish the response comprises not sending all of the data until the second request is received or the threshold amount of time after receipt of the first request elapses.

37. One or more computer storage media as recited in claim 29, wherein the indicator comprises a pipeline-request=1 header.

38. One or more computer storage media as recited in claim 29, wherein the one or more processors are part of a streaming media server and wherein the remote device comprises a client computing device.

39. A method, implemented in a device, the method comprising:

sending, to a remote device, a first request that comprises an indicator that the first request is one of two requests which are to be communicated from the device to the remote device as a test and used by the remote device to determine whether HyperText Transfer Protocol 1.1 (HTTP 1.1) or later pipelined streaming is supported by a connection between the device and the remote device before HTTP 1.1 pipelined streaming of data is initiated, wherein the test comprises sending the first request and a second request as back-to-back requests over the connection, and wherein the remote device can determine whether HTTP 1.1 pipelined streaming is supported by an intermediate device which is part of the connection based on whether the remote device receives the second request within a threshold amount of time of receiving the first request;

sending, to the remote device, a second request without waiting for a response to the first request from the remote device; and receiving, from the remote device, a response to the second request that comprises an indication of whether the test is a success or a failure, wherein the indication of whether the test is a success or a failure comprises a pipeline-result=1 header if the test is a success, and a pipeline-result=0 header if the test is a failure.

40. A method as recited in claim 39, wherein sending the second request comprises sending the second request after sending the first request.

41. A method as recited in claim 39, wherein the first request and second request are both HyperText Transfer Protocol (HTTP) GET requests.

42. A method as recited in claim 39, wherein sending the first request comprises sending the first request via a network, and wherein sending the second request comprises sending the second request via the network.

43. A method as recited in claim 39, wherein the indicator comprises a pipeline-request=1 header.

44. A method as recited in claim 39, wherein the device comprises a client computing device, and wherein the remote device comprises a streaming media server.

45. One or more computer storage media having stored thereon a plurality of instructions that, when executed by one or more processors of a device, causes the one or more processors to:

send, to a streaming data source, a first request that comprises an indicator that the first request is part of a test to determine whether HyperText Transfer Protocol 1.1 (HTTP 1.1) or later pipelined streaming is supported by a connection the streaming data source before HTTP 1.1 pipelined streaming of data via the connection is initiated, wherein the test of comprises sending the first request and a second request as back-to-back requests over the connection, and wherein the streaming data source can determine whether HTTP 1.1 pipelined streaming is supported by an intermediate device which is of the connection based on whether the streaming data source receives the second request within a threshold amount of time of receiving the first request;

send, to the streaming data source, the second request prior to receipt of a response to the first request from the streaming data source; and receive, from the streaming data source, a response to the second request that comprises an indication of whether the test is a success or a failure, wherein the indication of whether the test is a success or a failure comprises a pipeline-result=1header if the test is a success, and a pipeline-result=0 header if the test is a failure.

46. One or more computer storage media as recited in claim 45, wherein the instructions that cause the one or more processors to send the second request comprises instructions that cause the one or more processors to send the second request after the first request is sent.

47. One or more computer storage media as recited in claim 45, wherein the first request and second request are both HyperText Transfer Protocol (HTTP) GET requests.

48. One or more computer storage media as recited in claim 45, wherein the instructions that cause the one or more processors to send the first request and the second request comprise instructions that cause the one or more processors to send the first request and the second request via a network.

49. One or more computer storage media as recited in claim 45, wherein the indicator comprises a pipeline-request=1 header.

50. One or more computer storage media as recited in claim 45, wherein the device comprises a client computing device, and wherein the streaming data source comprises a streaming media server.

* * * * *